United States Patent [19]

Mazin et al.

[11] Patent Number: 4,704,701

[45] Date of Patent: Nov. 3, 1987

[54] CONDITIONAL CARRY ADDER FOR A MULTIBIT DIGITAL COMPUTER

[75] Inventors: Moshe Mazin, Andover; Edward T. Lewis, Sudbury, both of Mass.

[73] Assignee: Raytheon Company, Lexington, Mass.

[21] Appl. No.: 667,198

[22] Filed: Nov. 1, 1984

[51] Int. Cl.⁴ ............................................. G05F 7/50
[52] U.S. Cl. .................................................. 364/788
[58] Field of Search ........................ 364/784, 786–788

[56] References Cited

U.S. PATENT DOCUMENTS

| | | | |
|---|---|---|---|
| 3,100,835 | 8/1963 | Bedrij | 364/788 |
| 3,316,393 | 4/1967 | Rathazer | 364/788 |
| 3,766,371 | 10/1973 | Suzuki | 364/784 |
| 4,525,797 | 6/1985 | Holden | 364/788 |
| 4,564,921 | 1/1986 | Suganama | 364/784 |
| 4,573,137 | 2/1986 | Ohhashi | 364/788 |

FOREIGN PATENT DOCUMENTS 964375  3/1975  Canada ............................. 364/788

OTHER PUBLICATIONS

Bedrij, "Carry Select Adder", *IRE Transactions on Electronic Computers*, pp. 340–346, Jun. 1962.

*Primary Examiner*—Gary V. Harkcom
*Assistant Examiner*—Dale M. Shaw
*Attorney, Agent, or Firm*—Philip J. McFarland

[57] ABSTRACT

A multibit digital adder wherein a proper carry-out signal is generated simultaneously in different parts of such adder.

1 Claim, 4 Drawing Figures

CONDITIONAL CARRY ADDER FOR A MULTIBIT DIGITAL COMPUTER

BACKGROUND OF THE INVENTION

This invention pertains generally to digital LSI circuitry, and in particular to a very high speed 32 bit digital adder.

Because the binary adder is a basic building block of a digital computer, the speed of any digital computer is limited by the speed at which the binary adders in such a computer may be operated. The speed at which a 32 bit adder may be operated is of particular importance in a 32 bit computer. It is known that the carry-out, $C_{OUT}$, of a first adder may be used as the carry-in, $C_{IN}$, input of a complementary second adder to increase the speed of propagating the carry signal by eliminating the delay associated with an inverter stage. However, in a 32 bit adder wherein an array of 16 double adders is used, speed of operation is primarily limited by the delay involved in generating a $C_{OUT}$ signal through the blocks of adders because the $C_{OUT}$ signal from each block cannot be generated until the $C_{OUT}$ signal of all preceding blocks has been generated. That is to say, according to the prior art, the proper $C_{OUT}$ signals from each one of the blocks of adders making up a 32 bit adder cannot be generated simultaneously.

SUMMARY OF THE INVENTION

With the foregoing in mind, it is therefore an object of this invention to provide a very high speed 32 bit digital adder wherein the delay associated with propagating the $C_{OUT}$ signal is significantly reduced.

The foregoing and other objects of the invention are generally attained by providing a 32 bit adder comprising eight blocks, each with four bits. The first, or input, block comprises four adder stages, while each of the remaining seven blocks comprises a pair of four adder stages with one adder stage in each block having, a priori, a logic level one carry-in signal and the other adder stage having a logic level zero carry-in signal, thereby allowing all of the blocks to propagate an appropriate carry-out signal simultaneously. Appropriate switches are provided in the last seven blocks to select which of the pair of carry-out signals is utilized.

BRIEF DESCRIPTION OF THE DRAWINGS

For a more complete understanding of this invention, reference is now made to the following description of the accompanying drawings, wherein.

DESCRIPTION OF THE PREFERRED EMBODIMENT

Figure 1:
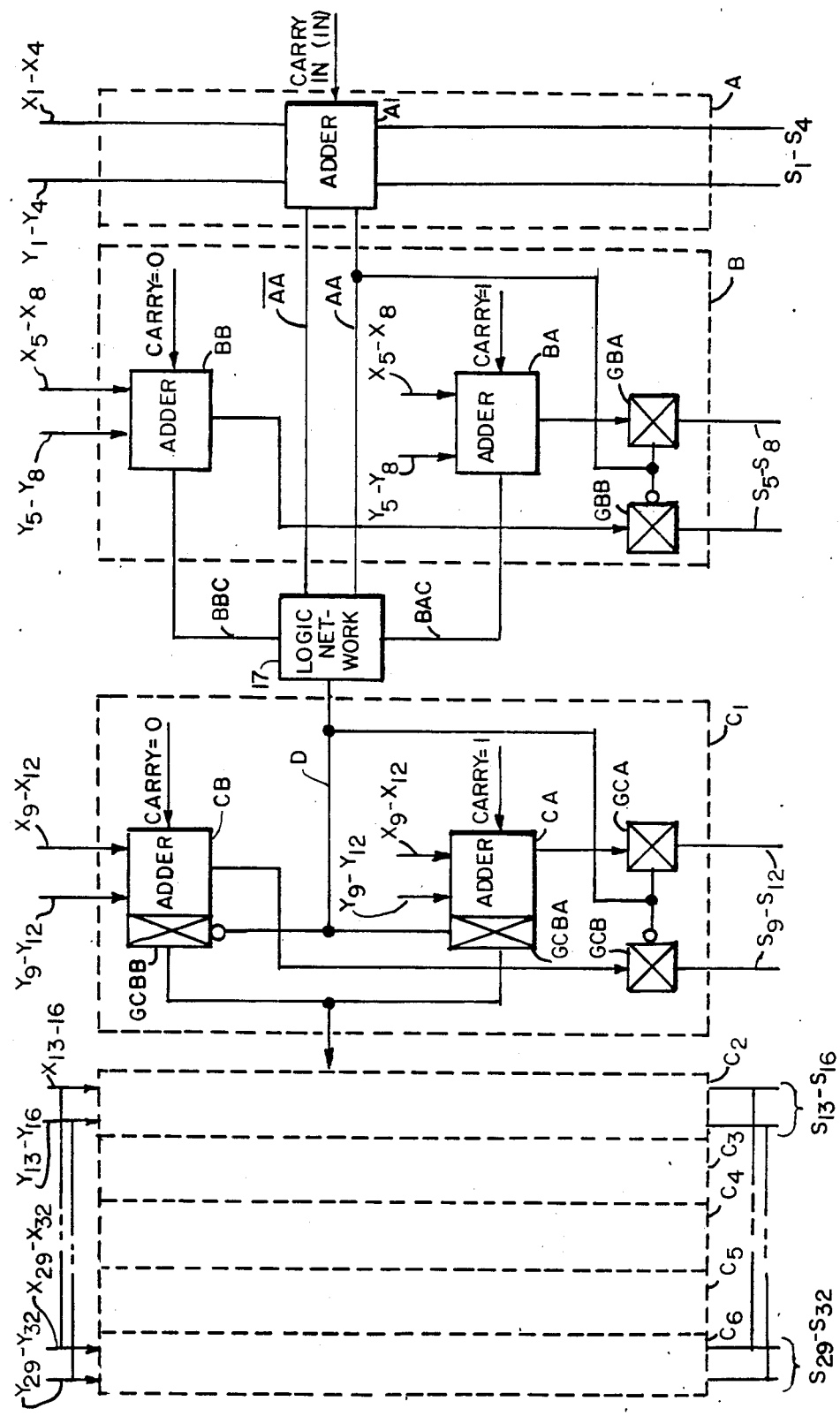
FIG. 1 is a simplified block diagram of a 32 bit adder according to this invention.

Before referring to the drawings in detail, it should be noted that the drawings (especially FIG. 1) have been simplified so that only the first one of the adder blocks that are constructed in the same manner is shown in detail. Further, it should be noted that, although the adders used in each adder block here are similar to the adders shown and described in U.S. patent application Ser. No. 648,930, filed Sept. 10, 1984, any other known adders could be used.

Referring now to FIG. 1, a 32 bit adder 20 according to this invention is shown to comprise eight blocks (A, B, C1 ... C6), each of which provides four sum output signals to make up the required 32 bits.

Block A comprises a four bit adder A1 receiving input signals $X_1$ through $X_4$ and $Y_1$ through $Y_4$, and a carry-in signal, $C_{IN}$, to produce four sum outputs $S_1$ through $S_4$, where $S_1 = X_1 \oplus Y_1 \oplus C_{IN}$. The four bit adder A1 produces a carry-out and an inverse carry-out output signal, here designated, respectively, as AA and $\overline{AA}$.

Figure 2A:
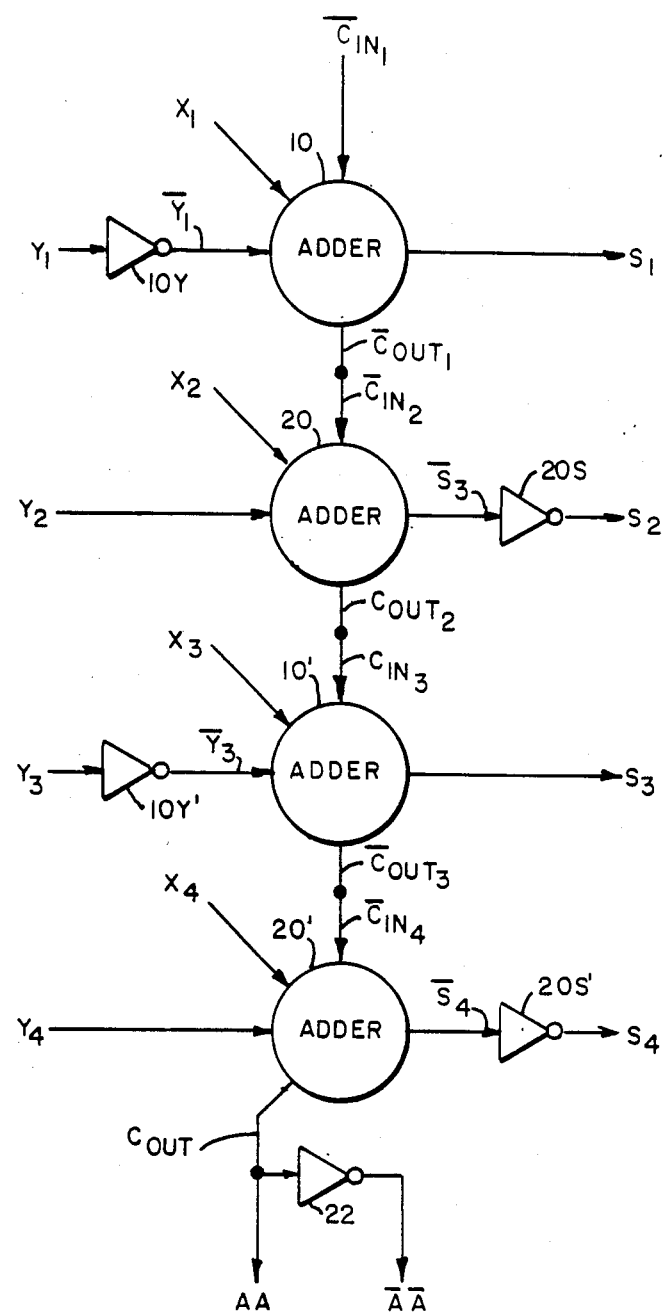
FIGS. 2A and 2B are sketches illustrating how the adders are combined to form a four bit adder for use in the contemplated 32 bit adder.
Figure 2B:
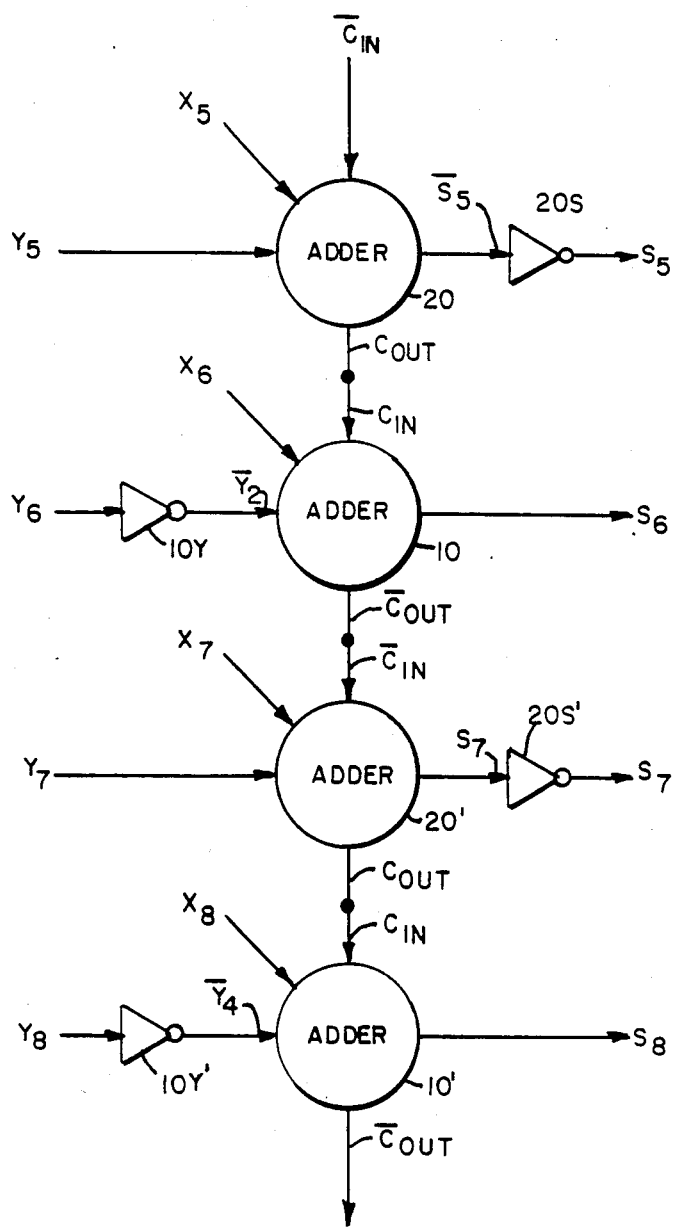

Referring now to FIG. 2A it may be seen that a pair of adders 10, 10', and a pair of adders 20, 20' are interconnected so as to four bit adder A1. Here adders 10, 10' are identical to the adder shown in FIG. 1 of U.S. Pat. application Ser. No. 648,930 cited above and adders 20, 20' are identical to the adder shown in FIG. 2 of that application. As described in detail in the cited application, adder 10 (or adder 10') is responsive to X, Y and $C_{IN}$ input signals to produce a sum (S) and an inverse carry-out ($\overline{C_{OUT}}$) signal, while adder 20 (or adder 20') is complementary to adder 10 (or adder 10') to be responsive to X, Y and $\overline{C_{IN}}$ input signals to produce an inverse sum ($\overline{S}$) and a carry-out ($C_{OUT}$) signal. To obtain the proper signals into adders 10, 10', inverters 10Y, 10Y' (not shown in FIG. 1) are disposed, as shown, in circuit with the $Y_1$, $Y_3$ lines. In this connection it will be observed that, if the X and Y signals are taken from registers (not shown), the $\overline{Y_1}$, $\overline{Y_3}$ signals may be taken directly off the complementary output of the appropriate stage of the register, thereby eliminating the need for the inverters 10Y, 10Y'. To obtain the proper sum signals out of the adders 20, 20', inverters 20S, 20S' (not shown in FIG. 1) are disposed as shown in circuit with the sum output lines of adders 20, 20'. The $C_{OUT}$ signal of adder 20' corresponds with the AA signal (FIG. 1). The $\overline{AA}$ signal (FIG. 1) is obtained by passing the $C_{OUT}$ of adder 20' through an inverter 22. It will be observed that: (a) if $C_{IN}$ to block A is at a logic one level, signal AA will be at a logic one level (and signal $\overline{AA}$ at a logic zero level); or if $C_{IN}$ to block A is at a logic zero level, signal $\overline{AA}$ will be at a logic one level (and signal AA at a logic zero level).

Referring back now to FIG. 1, the AA and $\overline{AA}$ output signals from block A are provided as two of the input signals to the logic network 17. The AA signal is also provided as a control signal to select one of a pair of transmission switches GBB and GBA for operation. As mentioned briefly hereinabove, the second block B of the 32 bit adder contains a pair of four bit adders BB and BA. Four bit adder BB is provided with an inverse carry-in, $\overline{C_{IN}}$, input (i.e., the carry-in input (not numbered) is tied to ground) or logic level zero. As may be seen, the four bit adder BB is formed from the four bit adder shown in FIG. 2A by: (a) interchanging adders 10, 20 (FIG. 2A) and adders 10', 20' (FIG. 2A); (b) maintaining the positions of the inverters 10Y, 10Y', 20S, 20S' with respect to the adders 10, 20, 10', 20'; and (c) eliminating inverter 22. The four bit adder BB then is responsive to X, Y and $\overline{C_{IN}}$ signals to produce four sum signals and a $C_{OUT}$ signal (GBB). Four bit adder BA is provided with a non-inverted carry-in, $C_{IN}$, input (i.e., the carry-in input (not numbered) is at the $+V_{DD}$, or logic one level). It follows, therefore, that four bit adders A1 and BA are identical except that the inverter 22 (FIG. 2A) is not used in adder BA. That is to say, the $\overline{C}_{OUT}$ signal from adder 10' (which signal is designated BAC in FIG. 1) is the only carry-out signal taken from adder 10'.

It will be evident that the proper carry-in signal is applied to either adder BA or adder BB. That is to say, either adder BA or adder BB will produce the "correct" sum of $X_5$-$X_8$ and $Y_5$-$Y_8$, meaning the sum of $X_5$-$X_8$ and $Y_5$-$Y_8$ with the actual carry-out signal from adder A1 in block A taken into account. Therefore, if $X_5$-$X_8$ and $Y_5$-$Y_8$ are applied to adder BA and to adder BB in block B at the same time as $X_1$-$X_4$ and $Y_1$-$Y_4$ are applied to adder A1, it will be apparent that either adder BA or adder BB will produce the proper value of the sum of $X_5$-$X_8$ and $Y_5$-$Y_8$ simultaneously with the production of the sum of $X_1$-$X_4$ and $Y_1$-$Y_4$ by adder A1. It is then necessary: (a) to select the proper one of the adders BA, BB; and (b) to provide a proper carry-in signal to block C. Selection of the proper one of the adders BA, BB is accomplished by actuating either one of a pair of transmission switches GBA, GBB by the signal on line AA. Thus, if the carry-out signal from adder A1 is at a logic one level, transmission switch GBA is actuated to pass the sum outputs of adder BA, but, if the carry-out signal from adder A1 is at a logic zero level, transmission switch GBB is actuated to pass the sum outputs of adder BB. As is well known in the art, transmission switches GBB and GBA may simply be p-channel and n-channel FETS.

Figure 3:
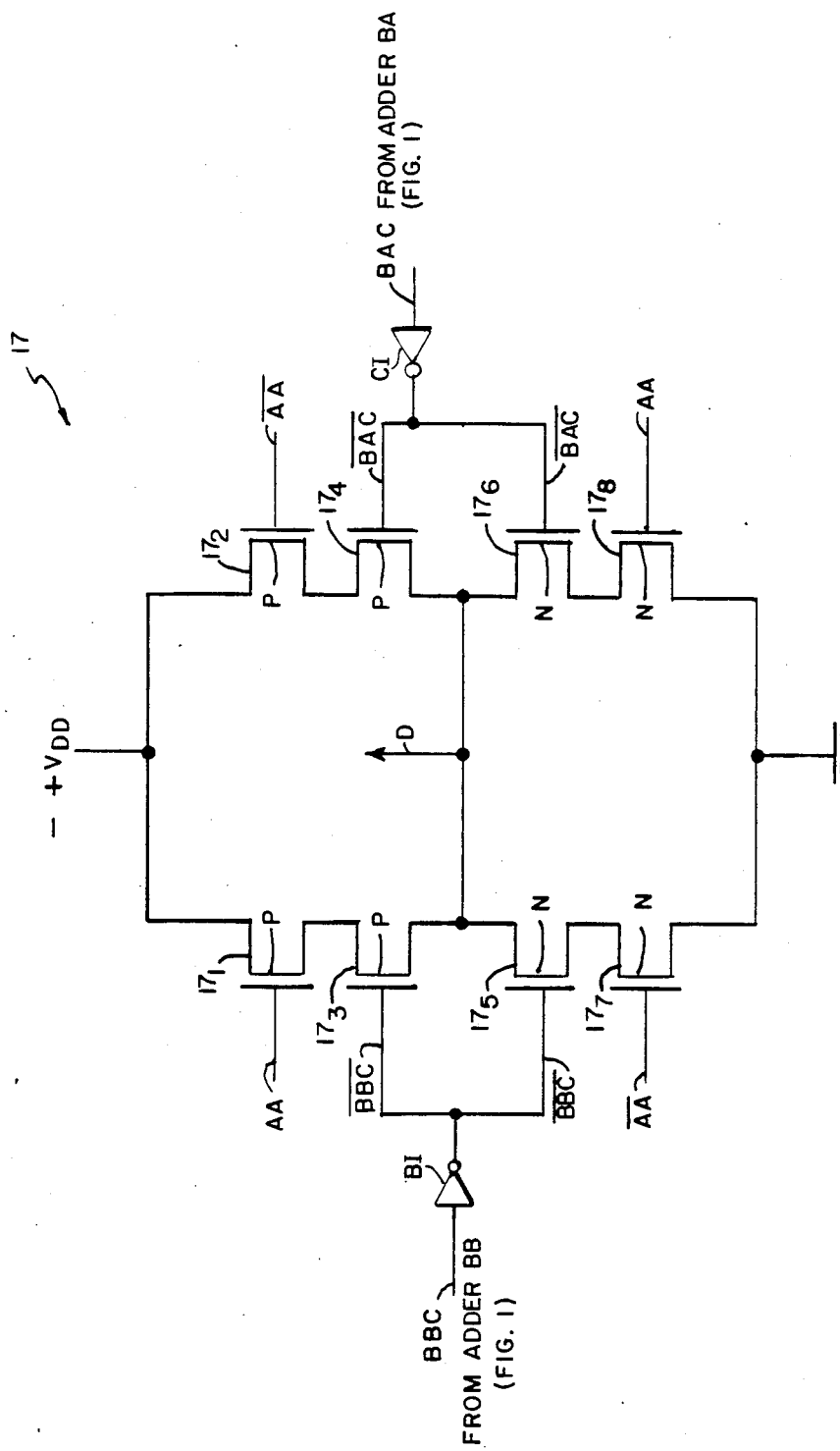
FIG. 3 is a schematic diagram of the logic network shown in FIG. 1.

Referring now to FIG. 3, the logic network 17 is shown to comprise four p-channel field effect transistors (FETS) $17_1$ through $17_4$ and four n-channel FETS $17_5$ through $17_8$ and inverters BI, CI connected as shown. The logic network 17 then is effective, in response to the carry-out signals of adders A1, BA, BB, to produce an output signal, D, that may be expressed by the following logic equation:

$$D = (AA)(BBC) + (\overline{AA})(BAC) \quad \text{(Eq. 1)}$$

The truth table for the logic network 17 is presented in TABLE 1:

TABLE 1

| AA | $\overline{AA}$ | $\overline{BBC}$ | $\overline{BAC}$ | D |
|----|----|-----|-----|---|
| 0  | 1  | 1   | 0   | 0 |
| 1  | 0  | 1   | 0   | 1 |

As can be seen from an inspection of TABLE 1, the status of the D output signal is dependent solely on the status of the AA and $\overline{AA}$ inputs (which would be expected because the $\overline{BBC}$ and $\overline{BAC}$ inputs may be considered to be constants since the carry-in inputs to the four-bit adders BA, BB are fixed). Otherwise stated, it is the status of the carry-in input (i.e., whether a logic level "0" or "1") to the four bit adder A1 that determines the status of the D output signal from the logic network 17. The D output signal in turn is effective to control transmission switches GCA, GCB (which switches are similar to transmission switches GBA, GBB) so that the sum output of the proper one of the four bit adders (CA, CB) in block $C_1$ is selected. The D output signal is also effective to control transmission switches GCBB and GCBA (which are similar to transmission switches GCA, GCB) to pass the carry-out signal from the adder in block $C_1$ whose sum signal is passed through the selected one of the transmission switches GCA, GCB to provide a carry-in signal to block $C_2$. The just-mentioned block (and each one of blocks $C_3$-$C_6$) is identical to block $C_1$. It should now be apparent to those of skill in the art that each one of the blocks $C_2$-$C_6$ operate in the identical fashion to block $C_1$.

Having described a preferred embodiment of this invention, it will now be evident to one of skill in the art that the embodiment may be changed without departing from the inventive concepts. It is felt, therefore, that this invention should not be restricted to the disclosed embodiment, but rather should be limited only by the spirit and scope of the appended claims.

What is claimed is:

1. In a multibit digital computer wherein at least a first, second and third portion of each of two multibit numbers to be added are applied to different blocks of adders comprising:
   (a) a first block of adders, such block including a single multibit adder responsive to the first $X_1 \ldots X_4$ and $Y_1 \ldots Y_4$ and to an initial carry-in signal, Co, for producing the sum of the first portions of the two multibit numbers and a pair of carry-out signals $\overline{AA}$, AA having a logic zero or a logic one level in accordance with the sum;
   (b) a second block of adders for producing the sum of the second four portions $X_5 \ldots X_8$, $Y_5 \ldots Y_8$ of the two multibit numbers, such block having a first multibit adder similar to the single multibit adder in the first block with a carry-in signal to such first multibit adder being at a logic one level and a second multibit adder complementary to the first multibit adder with a carry-in signal being at a logic zero level so that one of the first and second multibit adders produces a correct carry-out signal and a sum of the second portions of the two multibit numbers to be added and the carry-out signal from the first block;
   (c) means for selecting the sum out of the correct one of the first and second multibit adders in the second block, such means including first pairs of transmission gates, one of such pairs of gates being in circuit with the first multibit adder in the second block and responsive when the logic level of the carry-out signal AA is at a logic one level and the other one of such pairs of gates being in circuit with the second multibit adder and responsive when the logic level of the carry-out signal AA is at a logic zero level;
   (d) a logic network, responsive to the carry-out signal AA from the first block, the complement $\overline{AA}$ of such carry-out signal and the carry-out signals BBC, BAC from the first and second multibit adders in the second block, for producing a carry-in signal D for the third block in accordance with the logic equation: $D = (AA) \cdot (BAC) + (\overline{AA}) \cdot (BAC)$; such network including
   (e) a first and a second pair of p-type field effect transistors, the transistors in each pair being serially connected between a voltage source and a common point and the carry-out signals being applied to control such field effect transistors to cause the voltage at the common point to equal the voltage of the voltage source when the carry-out signal from the first block and the complement of the carry-out signal from the first multibit adder in the second stage are both at a logic one level or when the complements of the carry-out signal from the first block and the second multibit adder in the second block are both at a logic one level;

(f) a third and a fourth pair of n-type field effect transistors serially connected from the common point to ground, the carry-out signals being applied to control such field effect transistors to cause the voltage at the common point to be at ground potential when the complements of the carry-out signals from the first block and the first multibit adder in the second block are at a logic zero level or when the carry-out signal from the first block and the complement of the carry-out signal from the second multibit adder in the second block are at a logic zero level;

(g) a third and a fourth multibit adder in the third block, such third multibit adder corresponding with the first multibit adder in the second block and such fourth multibit adder corresponding with the second multibit adder in the second block whereby one of the third and fourth multibit adders produces a correct sum of the third portions of the two multibit numbers to be added and a correct carry-out signal; and (f) means for selecting the correct sum and the correct carry-out signal, such means including second pairs of transmission gates disposed in circuit with the multibit adders in the third block and responsive to pass the sum out of the one of the multibit adders in the third block having a carry-in signal at the same logic level as the carry-in signal D.

* * * * *

UNITED STATES PATENT OFFICE
CERTIFICATE OF CORRECTION

Patent No. 4,704,701   Dated   Nov. 3, 1987

Inventor(s) Moshe Mazin
            Edward T. Lewis

It is certified that error appears in the above-identified patent and that said Letters Patent are hereby corrected as shown below:

Column 2, line 16, after "to" insert -- make the --;

Column 3, line 38, delete "D=(AA)(BB)+(AA)(BAC)"

and insert therefor:

-- $D=(\overline{AA})(BBC)+(AA)(BAC)$ --   .

Signed and Sealed this

Twelfth Day of April, 1988

Attest:

DONALD J. QUIGG

Attesting Officer    Commissioner of Patents and Trademarks